United States Patent
Agrawal et al.

(10) Patent No.: US 7,035,929 B2
(45) Date of Patent: *Apr. 25, 2006

(54) METHOD FOR DYNAMICALLY ALLOCATING IP ADDRESSES FOR TIME SENSITIVE HOSTS BASED ON PRIORITIES AND GUARD BANDS

(75) Inventors: Prathima Agrawal, New Providence, NJ (US); David Famolari, Montclair, NJ (US); Tao Zhang, Fort Lee, NJ (US)

(73) Assignees: Telcordia Technologies, Inc., Piscataway, NJ (US); Toshiba America Research, Inc., Piscataway, NJ (US)

( * ) Notice: Subject to any disclaimer, the term of this patent is extended or adjusted under 35 U.S.C. 154(b) by 764 days.

This patent is subject to a terminal disclaimer.

(21) Appl. No.: 10/045,267

(22) Filed: Oct. 23, 2001

(65) Prior Publication Data

US 2003/0079017 A1    Apr. 24, 2003

(51) Int. Cl.
*G06F 15/173* (2006.01)

(52) U.S. Cl. .................... 709/226; 709/225; 709/227
(58) Field of Classification Search ............... 709/225, 709/229, 249, 201, 226, 227; 370/354, 313; 710/68; 345/156; 455/452.1
See application file for complete search history.

(56) References Cited

U.S. PATENT DOCUMENTS

| | | | | | |
|---|---|---|---|---|---|
| 5,795,709 | A | * | 8/1998 | Adegawa et al. | 430/627 |
| 6,008,777 | A | * | 12/1999 | Yiu | 345/2.1 |
| 6,101,499 | A | * | 8/2000 | Ford et al. | 707/10 |
| 6,243,772 | B1 | * | 6/2001 | Ghori et al. | 710/68 |
| 6,510,153 | B1 | * | 1/2003 | Inoue et al. | 370/354 |
| 6,618,757 | B1 | * | 9/2003 | Babbitt et al. | 709/226 |
| 6,857,018 | B1 | * | 2/2005 | Jiang | 709/225 |

OTHER PUBLICATIONS

Douglas E. Comer, "InternetWorking with TCP/IP Principles, Protocols, and Architectures", 1995, Prentice-Hall, Inc, vol. 1, Pg 237.*
R. Droms, "RFC 2131—Dynamic Host Configuration Protocol", 1997, Bucknell University.*

* cited by examiner

*Primary Examiner*—Zarni Maung
*Assistant Examiner*—Karen Tang
(74) *Attorney, Agent, or Firm*—Joseph Giordano; James W. Falk

(57) ABSTRACT

A method and system is provided for periodically and dynamically updating allocation pools of IP address which are reserved for wireless or wireline hosts. A system IP address server controls an entire address pool, contains predictive analysis logic, performs a predictive analysis, partitions the IP addresses into distinct address pools, and maintains "wireless guard bands" of IP addresses for wireless users to ensure that a higher priority address pool is never exhausted before an address pool which has a lower priority.

8 Claims, 3 Drawing Sheets

METHOD FOR DYNAMICALLY ALLOCATING IP ADDRESSES FOR TIME SENSITIVE HOSTS BASED ON PRIORITIES AND GUARD BANDS

BACKGROUND OF THE INVENTION

1. Field of the Invention

The present invention generally relates to the use of Mobile Internet Protocol ("IP") systems, methods and protocols in PCS systems and, more particularly, to a method for dynamically allocating IP addresses for time sensitive hosts based on priorities and guard bands.

2. Description of the Related Art

With the proliferation of wireless cellular devices (mobile stations), an increasing need has arisen for a methodology and system to provide seamless mobile access to the Internet via existing personal communication services (PCS) networks. To meet this need, the wireless access system must support high-speed packet data transmissions and must also efficiently communicate with the Internet backbone. While emerging PCS technologies, such as CDMA2000 and Wideband CDMA (WCDMA), define packet data transmission over the air interface, none of these systems present a flexible architecture for connecting a wireless access system to the Internet backbone which is also suitable for general mobile IP interconnectivity.

FIG. 1 is an illustration of a conventional cellular system network 10. The network 10 includes a mobile switching center (MSC) 12 connected to one or more base station controllers (BSC) 14. Each BSC 14 controls one or more base stations (BS) 16 which provide wireless communication links to various mobile stations (MS) 18. The MSC 12 interfaces to a public switched telephone network (PSTN) 20 for routing the voice calls and to a separate signaling system 22 for signaling used for PCS mobility management. Such a conventional cellular system provides Internet access through voiceband modems in the mobile stations, which connect to an Internet access server (not shown) interfaced to the MSC 12, either directly or via the PSTN 20. Alternatively, an interworking function (IWF) 24 interfaced directly to the MSC provides the interworking of protocols between the air interface and the Internet.

Although conventional cellular systems provide adequate data and voice service in some circumstances, such network configurations suffers from several deficiencies. In particular, the connection model is based on dialup modems where the IWF acts as a server, providing a point-to-point connection to the MS and assigning a temporary IP address to the MS that is valid only during the session. When the MS changes the point of attachment with the Internet (i.e., a hand off is performed), a new session must be established and a new temporary address must be assigned to the MS using an address assignment scheme. Therefore, an Internet session cannot be maintained as the MS changes the point of attachment.

As the MS moves across different subnets, packet delivery to the MS is based on the temporary IP address and not the static IP address of the MS. Since the MS does not have a static IP address, datagrams cannot be delivered to the MS until the MS has established a Point-to-Point Protocol (PPP) session and the host attempting to send data knows the temporary IP address of the MS.

The advent of wireless IP networks has presented challenging problems in the area of dynamic IP address allocation. Wireless IP networks comprise a plurality of network cells wherein a plurality of handoff and resident hosts communicate with the wireless IP network. Handoff hosts are network hosts whose initial network connection was established in another cell and that subsequently migrate to a new network cell. In contrast, resident hosts are hosts whose initial network connection was established in the present cell and that have not migrated to another network cell. Each network cell further includes a base station that maintains handoff and resident host network connections within the network cell, and facilitates dynamic handoff of handoff hosts within its cell.

The base station within each cell facilitates a network connection with its handoff and resident users through IP addresses assigned to the network hosts within the cell. Thus, an IP address must be allocated to the handoff and resident hosts within a cell to establish and maintain a network connection. The IP addresses dedicated to the handoff and resident hosts can be allocated by methods including an IP address server system(s) that assigns IP addresses for new hosts, and base stations themselves that may determine their own necessary IP address allocation. IP address servers that allocate IP addresses can include servers that are part of a base station itself, or can include IP address servers that are attached to the network and send IP address allocations to the base station within a cell. These IP address allocation methods and apparatuses confront a number of problems when allocating IP addresses to handoff and resident hosts within their cells.

First, whenever a host initially establishes a network connection within a cell, the host is considered a resident host, because it establishes its initial network connection within the cell. In order for the resident host to establish its network connection, a base station within the cell must allocate an IP address from the cell's IP address pool to the resident host. In contrast, whenever a resident host migrates to a new cell after already having its network connection in a prior cell, the host becomes a handoff host, and the new cell must maintain the preexisting network connection of the handoff host. If the new cell has a different IP subnet address relative to the prior cell, the new cell must allocate a new IP address to the handoff host in order to maintain the handoff host's network connection from the prior cell.

Current dynamic IP address allocation protocols such as Dynamic Host Configuration Protocol (DHCP) treat resident and handoff hosts as equivalent and without preference when allocating IP addresses to these hosts. Thus, a base station may allocate an IP address to a resident host instead of a handoff host, thereby permitting a new resident network connection in place of the prior network connection of a handoff host network, which must be dropped. This equal treatment is obviously undesirable, because denying a resident host an IP address will merely prevent a new network connection, whereas denying a handoff host an IP address causes its preexisting network connection to be terminated. Thus, IP address allocations to handoff hosts should be preferred to IP address allocations of resident hosts in order to facilitate the handoff of preexisting handoff host network connections.

Second, the problem of handoff and resident host network access is further aggravated due to the fact that there is no minimum number of IP addresses that are reserved by individual cells to ensure a certain level of host access. The minimum number of IP addresses available will vary from cell to cell, and thus handoff and resident hosts will have differing degrees of access to the IP network based on the particular cell wherein the host is communicating with the network. As a result, fair access to the wireless IP network for handoff and resident hosts differs from cell to cell, because one cell may have significantly fewer IP addresses to allocate relative to another cell. This is another limitation of present IP address allocation protocols, because it is desirable to ensure fair access of handoff and resident hosts to the network regardless of the particular cell wherein these hosts reside.

In sum, present dynamic IP address allocation protocols for wireless IP network systems suffer from two significant problems. First, these protocols treat resident and handoff hosts equally when allocating IP addresses, thereby causing preexisting handoff host network connections to be dropped in favor of new resident host network connections, when it is preferable to preserve a preexisting handoff host network connection by denying a new resident host network connection. Second, there is no minimum number of IP addresses allocated to individual cells, thereby causing fair access problems when different cells provide different numbers of IP addresses for handoff and resident hosts, thereby making network access arbitrarily dependent on the cell in which the handoff and network host reside.

New Internet Protocol(IP) based wireless networks are emerging. These emerging networks use IP protocols for transport and control of data and/or voice traffic which is transmitted over wireless and/or wired networks. IP Version 4 (IPv4) is the IP implementation standard which is in widespread use for such transmissions. With the increasing number of electronic devices, such as cell phones, personal digital assistants (PDAs) and handheld computers, which are becoming IP enabled, IPv4 can experience a shortage of addresses for assignment to each device. As a result, care must be taken to utilize address allocation schemes which ensure that a sufficient number of address space is reserved for assignment to each networked device.

IP version 6 (IPv6) is the next-generation IP protocol implementation standard. This standard possesses a significantly expanded address space to accommodate the ever expanding range of networked devices. The addressing scheme utilized in IPv6 is not expected to experience the address exhaustion associated with IPv4, and therefore address allocation schemes using IPv6 do not need to limit the number of addresses for assignment to each network device.

However, with the growing popularity of wireless communications and time sensitive communication sessions, the speed of address assignment, as opposed to the number of available addresses, has become the main detractor from achieving optimal network performance. Here, handoff hosts may be forced to experience unacceptable latencies in acquiring IP addresses. These latencies have a negative effect on application performance, and may cause the communication session to abort. Moreover, the rapid growth of wireline and wireless user populations has escalated the traffic experienced at IP address servers. With such an increase in the number of requests being handled at a server, the average service time per request increases. These increased service times increase the potential for users with time sensitive constraints to experience degraded network performances. Therefore, it is incumbent upon current address allocation schemes to distribute addresses for wireless and mobile users expediently such that address acquisition latencies do not occur.

IP hosts served by a new cell may belong to a different IP subnet. As a result, when wireless mobile hosts in an IP-based wireless network move into new cells, they are often required to update (change) their IP addresses. Furthermore, wireless and wireline IP hosts may share the same IP network and, consequently, will compete for the same pool of IP addresses. In IPv4 this competition for IP addresses can cause "address exhaustion," and therefore a judicious assignment of address space is important.

Accordingly, it is apparent that there is a need and desire for a method for dynamically allocating IP addresses to wireless and wireline IP hosts which share the same pool of IP addresses in a network such that time sensitive handoff hosts will possess a higher probability of obtaining a new IP address in a timely manner, and such that the probability of degraded network performance due to delays in the assignment of IP addresses to wireless hosts is reduced.

SUMMARY OF THE INVENTION

The present invention is a method for dynamically allocating IP addresses for time sensitive hosts based on priorities and guard bands. In accordance with the invention, the method differentiates between wireless hosts (time sensitive and time insensitive) and wireline hosts such that priorities for connecting each host are established prior to handing off mobile calls. Wireless hosts are classified into handoff hosts and dormant hosts.

A single system IP address server is used to periodically and dynamically update allocation pools of IP addresses which are reserved for wireless or wireline hosts. The system IP address server controls an entire address pool, contains predictive analysis logic, performs a predictive analysis, partitions the IP addresses into distinct address pools, and maintains "wireless guard bands" of IP addresses for wireless users to ensure that a higher priority address pool is never exhausted before an address pool which has a lower priority. The system IP address server also possesses an interface with which to add or delete IP addresses from each of the distinct address pools as required.

Within the pool of IP addresses allocated to wireless hosts, a "handoff guard band" of IP addresses is established for handoff hosts. Further, handoff hosts are provided with a higher access priority than other hosts such that system IP address servers process address requests from the handoff hosts before processing requests from other hosts. As a result, handoff latencies for wireless calls are reduced.

Predictive analysis is performed in the system IP address server to determine the number of IP addresses to allocate to wireless terminals in a handoff state, wireless terminals in a resident state, and wired terminals. In certain embodiments, the predictive analysis is performed using a moving weighted average, where the average number of requests from hosts in each category is recorded and the average number of total IP addresses over a suitable fixed period of time is computed. In other embodiments, the size of the guard bands is calculated statistically by determining the required volume of IP addresses over a fixed period of time. Here, various statistical parameters may be used, such as the time of day, the "mix" of traffic, special situations (expected and unexpected), or the like.

A priority is assigned to a host requesting a new IP address. Handoff hosts are provided with a higher access priority than other hosts such that system IP address servers process address requests from the handoff hosts before processing requests from other hosts. Priorities of the hosts are communicated to the IP address servers (e.g., the DHCP servers). As a result, the servers will first service the host having the highest priority. This permits wireless terminals to obtain IP addresses faster during handoff, and therefore reduces handoff latencies.

A classification process is used to classify wireless hosts into handoff hosts and dormant hosts. Handoff hosts carry active sessions across network boundaries and are rapidly configured with a valid IP address to preserve application level quality. Dormant hosts are those that are not actively communicating, and therefore possess greater latency latitudes with respect to the configuration of the IP address.

The classification processes also distinguishes between requests from time-sensitive hosts and requests from time-insensitive hosts. An explicit notification from an end user terminal making a request is used to distinguish between the requests from time-sensitive hosts and requests from time-insensitive hosts. To accomplish this, an option field is provided in a request protocol message. In the preferred embodiment, the option field is provided in a private option space of DHCP. This option is represented by a byte-code which represents a decimal number in the range of 128–254. When the wireless IP address agents receive requests having this number in its option field, the wireless IP address agents recognize that a time-sensitive host has sent a request. As a result, the wireless IP address agents allocate an address from its local time-sensitive address pool to the time sensitive host, instead of forwarding the request message to the system IP address server.

A minimum number of addresses, i.e., a wireless handoff IP address pool or a wired terminal IP address pool (a classification), which cannot be affected by a particular reallocation scheme, is made available to each category of device accessing the network. As a result, the system IP address server will be unable to revoke addresses from a classification such that the total number of addresses available in the classification is never brought below the guard band number. In addition, if a number of addresses are allocated as a result of wireless terminal requests that brings the total available IP addresses in such an allocation pool below the number of addresses in the guard band, an automatic request occurs to replenish the allocation pool up to the guard band level.

In accordance with the invention, a wireless handoff host is distinguished from a wireless resident host by determining whether the host has changed, or is in the process of changing, its current point of attachment to the network. For instance, handoff hosts are required to have undergone link-layer handoff procedures to establish a valid link layer with which to communicate with a base station. The base station will possess knowledge of this, and can use this information to identify hosts that have been handed off from other base stations.

A wireless IP address agent resides in the wireless network. Each wireless IP address agent handles requests for IP addresses from the wireless terminals, categorizes the wireless terminal as handoff or resident, and then forwards the IP address associated with the handoff or resident to the system IP address server.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF EXEMPLARY EMBODIMENTS

Figure 1:
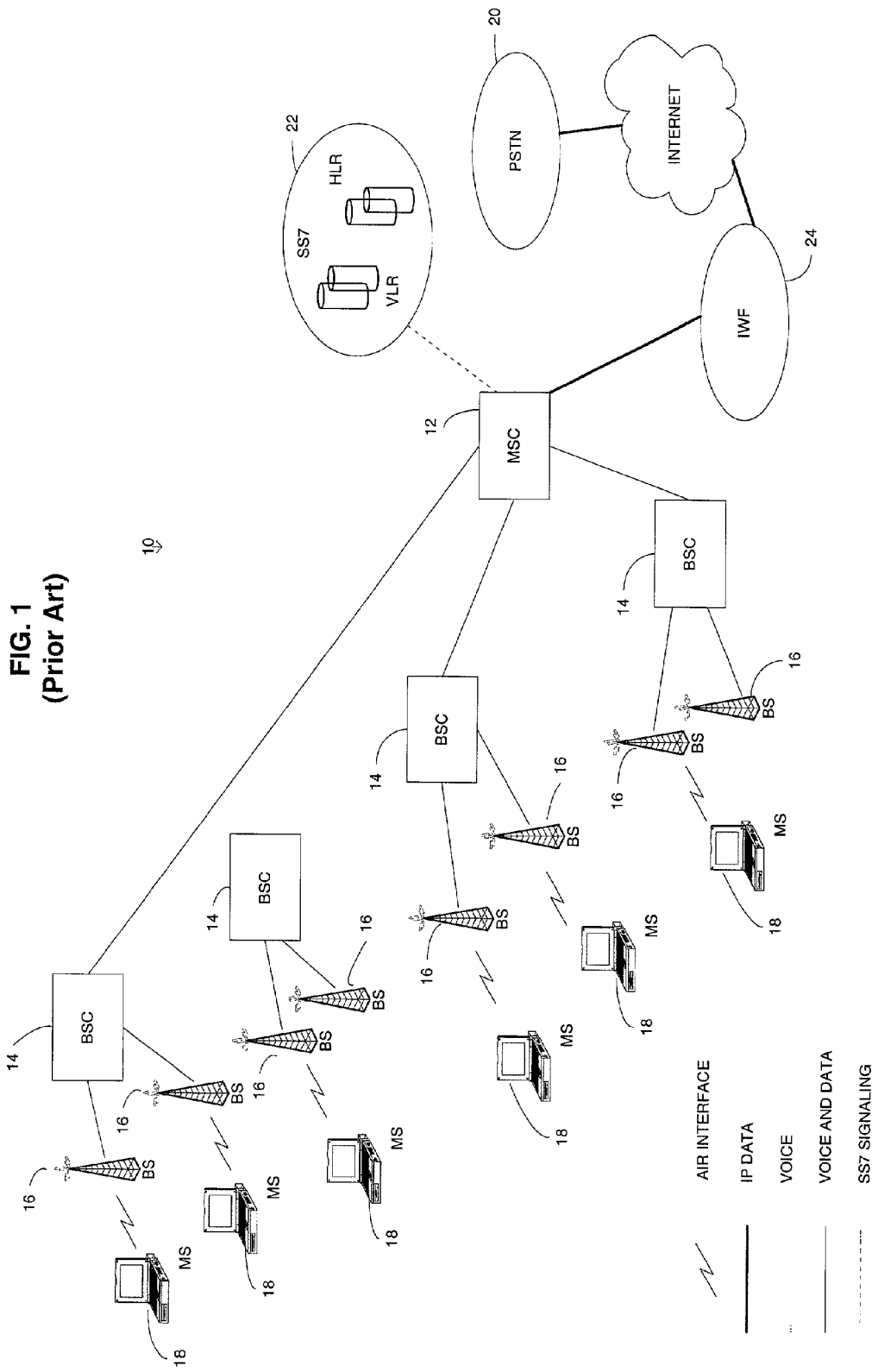
FIG. 1 is an illustration of a conventional cellular system network.
Figure 2:
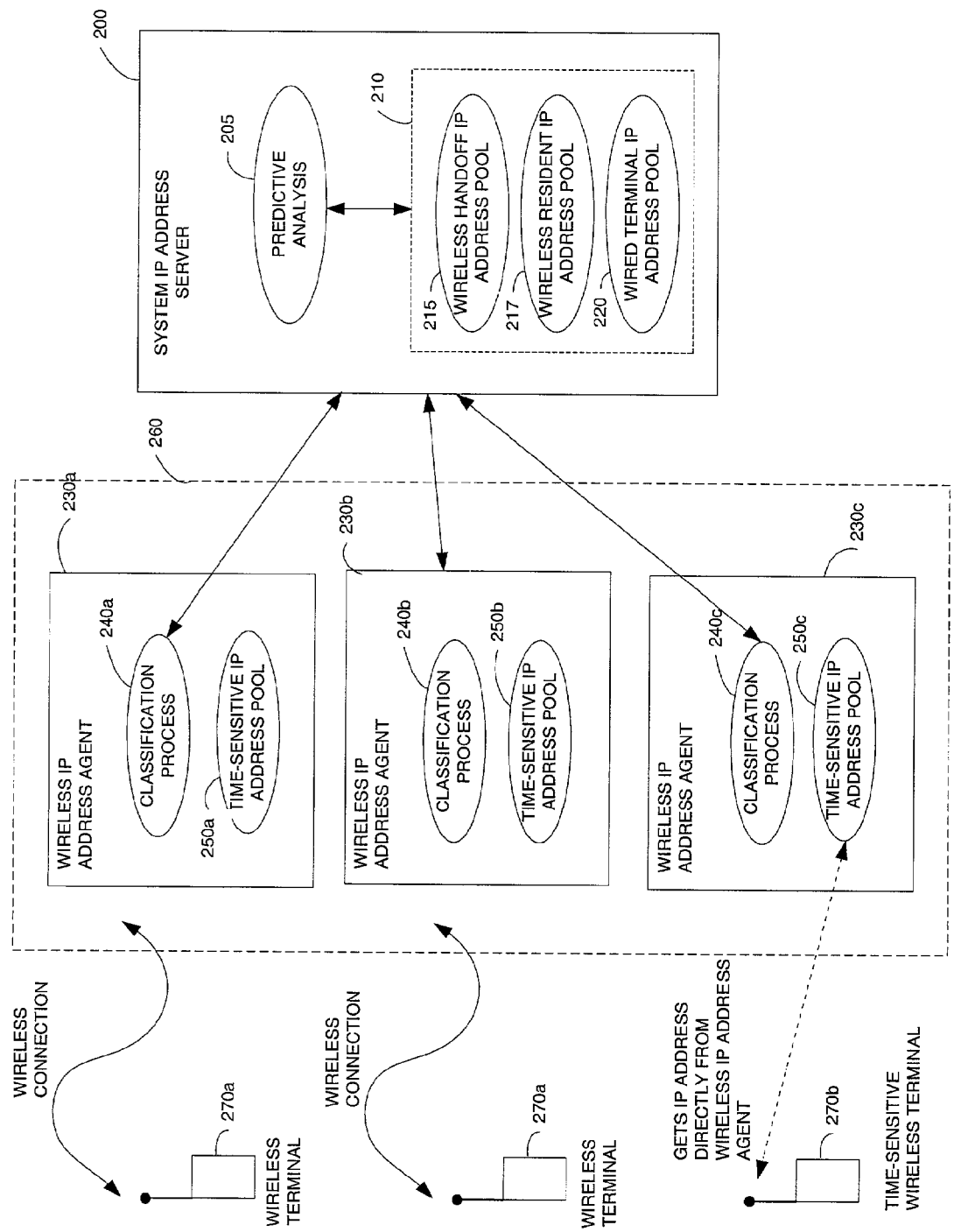
FIG. 2 is a schematic block diagram of shared IP servers without base station requests.

FIG. 2 is a schematic block diagram of shared IP servers without base station requests. The system and method of the invention provides dynamic addressing of servers (e.g., DHCP servers) such that the allocation of a proper portion of IP addresses to wireless host and wireline hosts is ensured. Wireless host 270a, 270b are end user devices which are connected to a network 260 via wireless channels. Such devices can be further categorized by whether they are in a handoff state (handoff) or are residents of a current wireless base station (resident).

In accordance with the invention, a single system IP address server 200 is used to periodically and dynamically update allocation pools of IP address which are reserved for wireless or wireline hosts 220. The system IP address server 200 controls an entire address pool 210, contains predictive analysis logic 205, performs a predictive analysis, partitions the IP addresses 210 into distinct address pools 215, 217, 220 such that "wireless guard bands" of IP addresses for wireless users are maintained to ensure that a higher priority address pool is never exhausted before an address pool which has a lower priority. The system IP address server 200 also possesses an interface (not shown) with which to add or delete IP addresses from each of the distinct address pools 215, 217, 220 as required. A guard band is a pool of IP addresses which are dedicated to a specific type of host (e.g., wireless hosts). Within the pool of IP addresses allocated to wireless hosts, a "handoff guard band" of IP addresses 215 is established for handoff hosts, a "resident guard band" of IP addresses 217 is established for resident hosts and a "wired terminal guard band" of IP addresses 215 is established for wired terminal hosts.

The system IP address server 200 performs a check of the validity of IP addresses in time-sensitive pools 230a, 230b, 230c as a background process to ensure that each IP address is valid prior to allocation of the IP address to a wireless host. The background check also includes the performance of ARP requests. These are protocol message packets which are broadcast into the network 260 that contain the specific valid IP address as a parameter field. Hosts in the network 260 receive this packet and check to determine whether the IP address of the hosts corresponds to the IP address in the ARP message. If the IP address of the host matches the IP address in the ARP message, the hosts use the IP address to communicate over the network 260.

Such a response is typically performed by a requesting host which was supplied with an IP address. However, such a host typically performs the ARP check prior to using the address to ensure that it is a valid address. The system IP address server 200 also performs this check on all IP addresses within its address pool 210 each time an IP address is entered into the address pool 210. Consequently, the hosts are not specifically required to expend time performing the ARP check, since validity of the addresses in the pool 210 is assured by the check which is performed in the system IP address server 200.

The predictive analysis 205 is performed in the system IP address server 200 to determine the number of IP addresses to allocate to wireless terminals in a handoff state, wireless terminals in a resident state, and wired terminals. In preferred embodiments, the predictive analysis is performed using a moving weighted average, where the average number of requests from hosts in each category is recorded and the average number of total IP addresses over a suitable fixed period of time is computed. In the preferred embodiment, the suitable fixed period of time is approximately 10 minutes. In other embodiments, the size of the guard bands is calculated statistically by determining the required volume of IP addresses over a fixed period of time. Here, various statistical parameters may be used, such as the time of day, the "mix" of traffic, special situations (expected and unexpected), or the like.

The following IP address guard bands are established within the system IP address server 200:

(i) Wireless guard bands: A pool of IP addresses is dedicated to wireless hosts. The size of the wireless guard band is dynamically based on the changing IP address demands of wireless and wireline terminals in the domain of the IP address servers (e.g., the DHCP servers); and (ii) Handoff guard bands: A pool of IP addresses from the IP space is allocated to wireless users for the support of handoff hosts. The size of such "handoff guard bands" is dynamically adjusted based on the handoff volume. IP address server 240 dynamically predicts the size of each guard band. The IP address servers then partition the shared pool of IP addresses accordingly before the anticipated IP address demands actually arrive. The shared address server 200 predicts the sizes of the address guard bands for each base station, and logically partitions the available shared address space on the system IP address server 200 for the guard bands based on information gathered from each base station.

A priority is assigned to a host requesting a new IP address. Handoff hosts are provided with a higher access priority than other hosts, such that system IP address servers process address requests from the handoff hosts before processing requests from other hosts. Priorities of the hosts are communicated to the IP address servers (e.g., the DHCP servers). As a result, the servers will service the host having the highest priority first. This permits wireless terminals to obtain IP addresses faster during handoff, and therefore reduces handoff latencies.

Wireless IP address agent 230a, 230b, 230c are software which resides in the wireless network 260. Each wireless IP address agent handles requests for IP addresses from the wireless terminals 270a, 270b, categorizes the wireless terminal as a handoff or resident host, and then forwards the IP address associated with the handoff hosts or resident hosts to the system IP address server 200. In embodiments, the wireless IP address agents 230a, 230b, 230c reside in wireless base stations (not shown) which provide link layer attachments to wireless terminals. Here, the base stations receive IP address requests and forward them to the system IP address server 200. As a result, the system IP address server 200 can distinguish between IP address requests which originate from wireless or wireline terminals.

Classification processes 240a, 240b, 240c are used to classify wireless hosts into handoff hosts and dormant hosts. Handoff hosts carry active sessions across network boundaries and are rapidly configured with a valid IP address to preserve application level quality. Dormant hosts are those that are not actively communicating, and therefore possess greater latency latitudes with respect to configuration of the IP address. In addition, the system IP address server also assigns an initial allocation of addresses to the wireless IP address agents 230a, 230b, 230c to store in their time-sensitive IP address pool 250a, 250b, 250c. In embodiments of the invention, the allocation of IP addresses is defined by a network administrator.

The classification processes 240a, 240b, 240c also distinguishes between requests from time-sensitive hosts 270b and requests from time-insensitive hosts 270a. DHCP protocol provides a framework for passing configuration information to hosts on a TCP/IP network. Here, configuration parameters and other control information are carried in tagged data items which are stored in an "option" field of the DHCP message. The data items themselves are called options. In accordance with the invention, an explicit notification from an end user terminal making a request is used to distinguish between the requests from time-sensitive hosts 270b and requests from time-insensitive hosts 270a. To accomplish this, an option field is provided in a request protocol message. In the preferred embodiment, the option field is provided in a private option space of DHCP. This option is represented by a byte-code which represents a decimal number in the range of 128–254. Hence, any specific number within this range may be used to indicate that a request is time-sensitive. However, in accordance with the invention, the use of this number to provide the explicit notification requires that no other site-specific DHCP option may use the specific number. Thus, when the wireless IP address agents 230a, 240b, 230c receive requests having this number in its option field, the wireless IP address agents recognize that a time-sensitive host 270b has sent a request. As a result, the wireless IP address agents 230a, 240b, 230c allocate an address from its local time-sensitive address pool 250a, 250b, 250c to the time sensitive host 270b, instead of forwarding the request message to the system IP address server 200.

In addition, IP address caches (not shown) are deployed on the base stations (not shown) for quicker allocation to time-sensitive hosts. This alleviates the requirement to obtain an IP address from the system IP address server 200. In essence, IP address pools associated with time-sensitive hosts are placed on the wireless base station, as opposed to the system IP address server 200 to facilitate expeditious address assignments.

A minimum number of addresses or guard bands in the wireless handoff IP address pool 210, the wireless handoff IP address pool 217 and the wired terminal IP address pool 215 (a classification) are set aside so that each are unaffected by a particular reallocation scheme. As a result, the system IP address server 200 will be unable to revoke addresses from a classification such that the total number of addresses available in the classification is never brought below the guard band number. In addition, if a number of addresses are allocated as a result of wireless terminal requests that brings the total available IP addresses in such an allocation pool below the number of addresses in the guard band, an automatic request occurs to replenish the allocation pool up to the guard band level. For example, if the number of IP addresses assigned to a "wireless resident" host address pool is 100 with a guard band of 10, then in accordance with the invention at least 10 addresses are maintained in the pool. Hence, if 95 "wireless resident" hosts addresses are requested and granted, an automatic attempt is made to allocate at least another 5 addresses to this category to maintain the appropriate guard band.

In accordance with the invention, a wireless handoff host is distinguished from a wireless resident host by determining whether the host has changed, or is in the processes of changing, its current point of attachment to the network. For instance, handoff hosts are required to have undergone link-layer handoff procedures to establish a valid link layer with which to communicate with a base station (not shown).

The base station will possess knowledge of this, and can identify hosts that have been handed off from other base stations.

Implementation of the classification process 240a, 240b, 240c varies according to the specific wireless access technology in use, such as CDMA, Time Division Multiple Access (TDMA), 802.11b, or the like. When using CDMA, a handoff is always preceded by a Handoff Request Message. This provides the base station with the ability to determine whether a terminal is a wireless handoff terminal based on the received Handoff Request Message. This is not the case with wireless resident hosts, and there are no handoff messages received by the base station associated with these terminals. Therefore the classification process can use this information to determine the nature of the request. If a request comes from a wireless terminal "shortly" after a Handoff Request Message was received from this terminal, the wireless terminal is classified as a wireless handoff host, otherwise it is classified as a wireless resident host. Here, "shortly" is implementation specific, and is programmed by the network administrator such that it is any time period desired. However, a time period which is too large is disadvantageous when used in the present contemplated embodiments. In the preferred embodiment, a time period in the range of approximately 30 to 60 seconds is used. Hence, when an address request is received from a terminal having a prior Handoff Request Message associated with it in the previous 60 seconds, the terminal is classified as a wireless handoff host.

Figure 3:
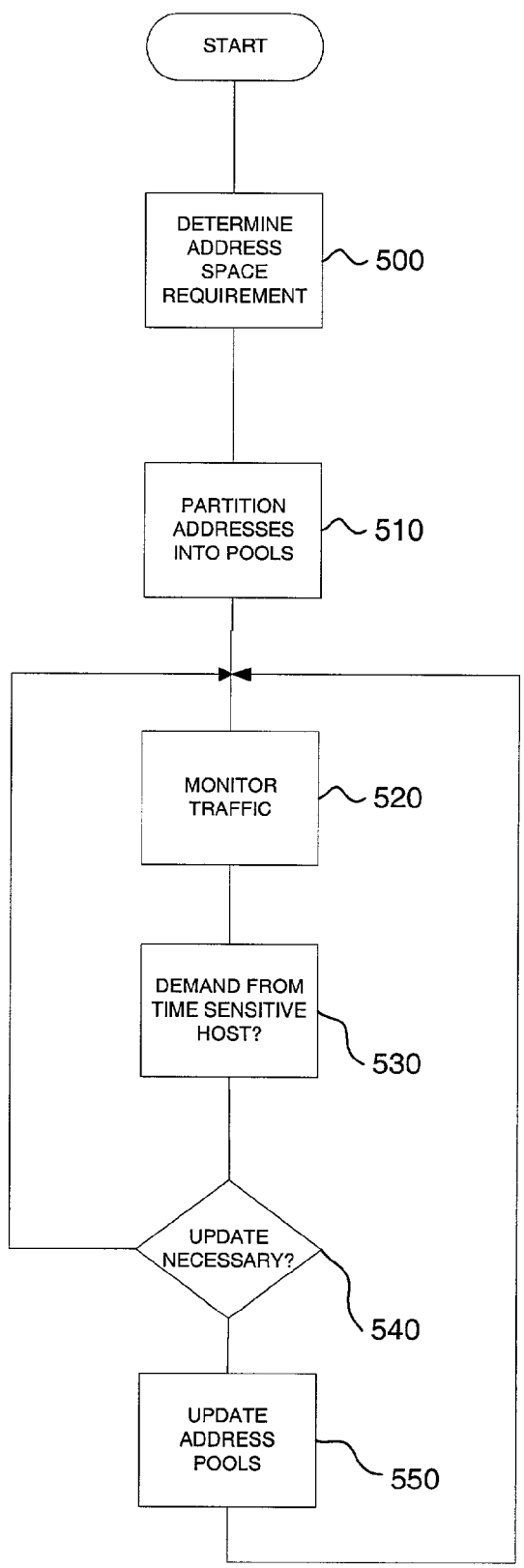
FIG. 3 is a flow chart illustrating the steps of an embodiment of the method of the invention for dynamically allocating Internet protocol addresses for time sensitive hosts based on priorities and guard bands.

FIG. 3 is a flow chart illustrating the steps of an embodiment of the method of the invention for dynamically allocating Internet protocol addresses for time sensitive hosts. In accordance with the invention, a determination of a total IP address pool requirement is performed using a predictive analysis, as indicated in step 500. In embodiments of the invention, the initial allocation is configured by a network administrator. In addition, the predictive analysis may be performed using a number of predictive algorithms, such as a moving weighted average. Here, the average number of requests from hosts in each device category is recorded, and the number of requests over a fixed period of time is calculated. In the preferred embodiment, an exemplary time period is 10 minutes.

Next, the total IP address pool is partitioned into groups of addresses which are designated for use with an associated user group or classification, i.e., a handoff group, a resident group and/or a wired terminal group, as indicated in step 510.

An IP address server is used to monitor IP address demands associated with a cell, as indicated in step 520. A check is made to determine whether an IP address demand is originating from a time sensitive host or from a time in-sensitive host, as indicated in step 530. A check is performed to determine whether an update of the total IP address pool is necessary, as indicated in step 540.

Based on the cumulative information gathered in steps 520 and 530, the IP address server will periodically and dynamically update the allocations reserved for the groups of addresses which are designated for use with the associated user group, as indicated in step 550. A return to step 520 occurs to continue monitoring IP address demands associated with the cell. If no update is necessary, the method of the present invention will also return to step 520 where monitoring of IP address demands associated with the cell is repeated. In this manner, continuous monitoring of IP address demand is performed to ensure the allocation of a proper portion of IP addresses to wireless host and wireline hosts.

A number of features of the present invention will be apparent to one skilled in the art. First, third parties such as wireless Internet Service Providers (ISPs) can control allocation of IP addresses to network cells. The present invention enables wireless and wireline ISPs to specify and control how IP addresses should be allocated to network cells in the wireless IP network, thereby allowing the ISP to allocate more IP addresses in specific network cells. For instance, an ISP may allocate more IP addresses to an area where high-paying customers reside so that network performance in that area is enhanced.

When allocating IP addresses to cells, third-party ISPs may directly specify the number of IP addresses to allocate to each cell or geographical area that is covered by multiple network cells in order to support the third-party's services. A third-party may also specify performance objectives that can be achieved by a plurality of IP address allocations to the network cells, and then allow the IP address servers to allocate IP addresses to meet these performance objectives. For instance, a third-party may specify call blocking probabilities and quality of service for a geographical area, and then allow the wireless IP network address servers to determine the actual IP address allocations for cells within the geographical area to meet these performance objectives. In addition, the third-party ISP may define the initial allocation of IP addresses to each wireless IP address agent.

Using the method of the invention, a rapid priority based configuration of IP addresses for wireless users is achieved. IP addresses are reserved for handoff hosts such that handoff call blocking due to lack of IP addresses in a new cell is minimized. In addition, the reservation of IP addresses for wireless dormant hosts minimizes the time to configure IP addresses. In addition, valuable processing time is conserved by distinguishing between hosts which are time sensitive and hosts which are time in-sensitive.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A system for dynamically allocating Internet Protocol (IP) addresses for wireless cells in a communication network including wireless and wireline terminals, wireless address agents, and a system IP address server, said system IP address server including a wireless handoff IP address pool, a wireless resident IP address pool, and a wired terminal IP address pool and a predictive analysis for allocating IP addresses between said pools; and said wireless IP agents including a time-sensitive IP address pool which receives an allocation of addresses from said system IP address server and a classification process which determines if a wireless terminal requesting an IP address is a time-sensitive host or a time insensitive host, said wireless IP agent directly forwarding to the requesting wireless terminal an IP address from its time sensitive IP address pool if the requesting terminal is a time-sensitive host and forwarding the request to the system IP address server if the requesting terminal is a time insensitive host.

2. A method for dynamically allocating Internet Protocol addresses for wireless cells in a communication network including wireless and wireline terminals, wireless agents, and a system IP address server, said method comprising the steps of:

said system IP address server predicatively allocating addresses to a wireless handoff address pool, a wireless resident IP address pool, and a wired terminal IP address pool and forwarding to rime sensitive address pools in said wireless IP address agents IP addresses;

each wireless IP agent upon receiving a request for an IP address from a wireless terminal determining if said request is time sensitive or time insensitive;

if said request is time sensitive, said wireless IP agent directly providing to said requesting wireless terminal an IP address from its time sensitive IP address pool; and if said request is time insensitive, said wireless IP agent forwarding said request to said IP address server.

3. The method in accordance with claim 2 wherein said step of determining comprises receiving a predetermined byte-code in an option field within a DHCP request message from the requesting wireless terminal.

4. The method in accordance with claim 3 wherein the predetermined byte-code represents a decimal number in a range of 128–254.

5. A method for dynamically providing an Internet Protocol (IP) address pool for a dynamic address allocation protocol to serve addresses for a wireless cell depending on whether a request for an address by a wireless cell involves a time sensitive or a time insensitive demand, said method comprising the steps of:

partitioning the IP pool into groups of address spaces for use with an associated user group within the wireless cell;

monitoring the types and frequencies of address demands associated with the wireless cell, the wireless cell distinguishing between time sensitive IP address demands and time insensitive IP address demands for the assignment of an IP address from the IP address pool; and updating the groups of address spaces by a system IP address server based on the number of time sensitive and time insensitive demands as distinguished by the wireless cell.

6. The method of claim 5 wherein said dynamic address allocation protocol is DHCP.

7. The method of claim 5 wherein a request for an address by a wireless cell Involving a handoff host is a time sensitive request and a request involving a dormant host is a time insensitive request.

8. A method for dynamically providing IP addresses to requesting wireless terminals in a communication network, said method comprising the steps of a system IP address server predicatively allocating addresses to a plurality of IP address pools and providing pools of IP addresses to wireless IP address agents;

a wireless IP agent upon receiving a request for an IP address from a requesting wireless terminal determining if said request is time sensitive or time insensitive;

if said request is time sensitive said wireless IP agent directly providing to said wireless terminal an IP address from the IP address pool at said wireless IP agent; and if said request is time-insensitive, said wireless IP agent forwarding said request to said system IP address server.

* * * * *

UNITED STATES PATENT AND TRADEMARK OFFICE
CERTIFICATE OF CORRECTION

PATENT NO.        : 7,035,929 B2
APPLICATION NO.   : 10/045267
DATED             : April 25, 2006
INVENTOR(S)       : Agrawal et al.

Page 1 of 1

It is certified that error appears in the above-identified patent and that said Letters Patent is hereby corrected as shown below:

In the Claims

In Column 11, Line 7, in Claim 2, delete "rime" and insert -- time --, therefor.

In Column 12, Line 12, in Claim 7, delete "Involving" and insert -- involving --, therefor.

Signed and Sealed this
Thirtieth Day of December, 2014

Michelle K. Lee
*Deputy Director of the United States Patent and Trademark Office*